(12) United States Patent
Ayabe

(10) Patent No.: US 7,853,117 B2
(45) Date of Patent: Dec. 14, 2010

(54) INFORMATION PROCESSING APPARATUS AND METHOD AND COMPUTER PROGRAM

(75) Inventor: Yuji Ayabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1096 days.

(21) Appl. No.: 11/407,763

(22) Filed: Apr. 20, 2006

(65) Prior Publication Data

US 2006/0239638 A1   Oct. 26, 2006

(30) Foreign Application Priority Data

Apr. 22, 2005   (JP) ............... P2005-124933

(51) Int. Cl.
  H04N 5/91   (2006.01)
  H04N 5/94   (2006.01)
  G06F 11/00  (2006.01)

(52) U.S. Cl. ............... 386/46; 386/47; 386/95; 714/2; 714/15

(58) Field of Classification Search ............ 386/46; 358/1.15; 714/616, 2; 711/15, 18
See application file for complete search history.

(56) References Cited

U.S. PATENT DOCUMENTS 6,549,494 B2 *   4/2003   Kobayashi ............... 369/47.1

2003/0223140 A1 *  12/2003  Kobata et al. ............... 360/15
2005/0141711 A1 *   6/2005  Inoue et al. ............... 380/228

FOREIGN PATENT DOCUMENTS

| JP | 3 265921 | 11/1991 |
|----|----------|---------|
| JP | 4 28344 | 3/1992 |
| JP | 6 12336 | 1/1994 |
| JP | 11 250578 | 9/1999 |
| JP | 2002 152658 | 5/2002 |
| JP | 2002 184104 | 6/2002 |
| JP | 2003-30925 | 1/2003 |
| JP | 2003 122755 | 4/2003 |
| JP | 2003 337660 | 11/2003 |
| JP | 2004 48337 | 2/2004 |
| JP | 2004 164213 | 6/2004 |

* cited by examiner

Primary Examiner—Benny Q Tieu
Assistant Examiner—Ngon Nguyen
(74) Attorney, Agent, or Firm—Frommer Lawrence & Haug LLP; William S. Frommer; Thomas F. Presson

(57) ABSTRACT

An information processing apparatus that reliably records data to predetermined recording media and stores the recorded data therein. A HDD recording control block relates recording data with identification information for identifying a DVD and records the data and information to a HDD. A DVD recording control block records the recording data to the DVD. If a trouble occurs on the DVD, the DVD recording control block identifies and reads the recording data related with the identification information of the DVD from the HDD and records the recording data to another DVD.

5 Claims, 6 Drawing Sheets

INFORMATION PROCESSING APPARATUS AND METHOD AND COMPUTER PROGRAM

CROSS REFERENCES TO RELATED APPLICATIONS

The present invention contains subject matter related to Japanese Patent Application JP 2005-124933 filed in the Japanese Patent Office on Apr. 22, 2005, the entire contents of which being incorporated herein by reference.

BACKGROUND OF THE INVENTION

The present invention relates to an information processing apparatus and method and a computer program and, more particularly, to an information processing apparatus and method and a computer program for realizing the recording of data to predetermined media and the storage of recorded data significantly reliably.

In recent years, recording apparatus have been finding their applications in a variety of fields. For example, the medical field uses a recording apparatus for recording images indicative of the inside of patent's body imaged with ultrasonic diagnostic equipment. The recording object of the recording apparatus used in the medical field, namely images of the inside of the patent's body for example, is very important data; therefore, it is fundamental to record and store these images without failure.

A method of effectively protecting data recorded on a predetermined recording medium if a trouble happens thereon during data recording is disclosed in Japanese Patent Laid-open No. 2003-30925 (hereinafter referred to as Patent Document 1) for example.

SUMMARY OF THE INVENTION

However, the method disclosed in Patent Document 1 has a problem that, if a trouble occurs on a predetermined recording medium during data recording, it becomes impossible to record the data to be later recorded to the predetermined medium (namely, the remaining data), thereby recording only a part of the data that is to be recorded to the predetermined medium. Namely, the above-mentioned method has a difficulty of surely recording data to a predetermined medium.

In addition, the method disclosed in Patent Document 1 involves another problem that, if a trouble occurs on a predetermined medium after data recording to make at least part of the recorded data impossible to read, it cannot be said that the reliable recording of data to a predetermined medium has been realized.

Therefore, present invention addresses the above-identified and other problems associated with related-art methods and apparatus and solves the addressed problems by realizing the significantly reliable recording and storage of data on a predetermined medium.

According to an embodiment of the present invention, there is provided an information processing apparatus for recording data to a recording medium of a first type and a recording medium of a second type. This information processing apparatus has a first recording controller for controlling recording of recording data to be recorded to a first recording medium of the first type to a recording medium of the second type by relating the recording data with recording medium identification information for identifying the first recording medium and a second recording controller for controlling recording of the recording data to the first-type recording medium. In this information processing apparatus, if a trouble occurs on the first recording medium, the second recording controller identifies and reads the recording data related with the recording medium identification information of the first recording medium from the recording medium of the second-type, thereby recording the recording data to a second recording medium of the first type.

The above-mentioned information processing apparatus further has a loader for loading a recording medium of the first type, a detector for detecting whether a trouble has occurred on the first recording medium while control for recording the recording data to the first recording medium loaded on the loader is being executed by the second recording controller, and a presentation device for, if a trouble that has occurred on the first recording medium is detected by the detector, notifying a user thereof. In the above-mentioned information processing apparatus, the fist recording controller continues control of recording the recording data to a recording medium of the second type regardless of a result of the detection by the detector and the second recording controller, if the occurrence of a trouble on the first recording medium is detected by the detector, stops control of recording the recording data to the first recording medium and, if, after control of recording the recording data to a recording medium of the second type by the first recording controller has been completed, the user unloads the first recording medium from the loader upon recognition of contents of the notification given by the presentation device and then loads the second recording medium, identifies and reads the recording data related with the recording medium identification information of the first recording medium from a recording medium of the second type, thereby recording the recording data to the second recording medium.

According to an embodiment of the present invention, there is provided an information processing method for an information processing apparatus for recording data to a recording medium of a first type and a recording medium of a second type. This information processing method has steps of controlling recording of recording data to be recorded to a first recording medium of the first type to a recording medium of the second type by relating the recording data with recording medium identification information for identifying the first recording medium, controlling recording of the recording data to the first-type recording medium, and identifiably reading, if a trouble occurs on the first recording medium, the recording data related with the recording medium identification information of the first recording medium from the recording medium of the second-type, thereby recording the recording data to a second recording medium of the first type.

A computer program according to the invention corresponds to the above-mentioned information processing method according to the invention.

In the information processing apparatus and method and a computer program according to the invention, recording data to be recorded to a first recording medium of a first type is recorded to a recording medium of a second type as related with medium identification information for identifying the first recording medium as well as to the first recording medium. If a trouble occurs on the first recording medium, the recording data related with the medium identification information of the first recording medium is identified and read from a recording medium of a second type to be recorded to a second recording medium of the first type.

The recording medium of the first type and the recording medium of the second type may be incorporated in the information processing apparatus or removable.

The first type and the second type may be different from each other or the same.

As described and according to the invention, data may be recorded to recording media of predetermined types. Especially, if a trouble occurs on a first recording medium of a predetermined type during or after data recording, all the data to be recorded to the first recording medium or already recorded thereto may be recorded to a second recording medium of that predetermined type. Consequently, the novel configuration allows the surer recording of data to recording media of that predetermined type as well as the surer storage of the recorded data therein.

DETAILED DESCRIPTION OF THE PREFERRED EMBODIMENTS

Figure 1:
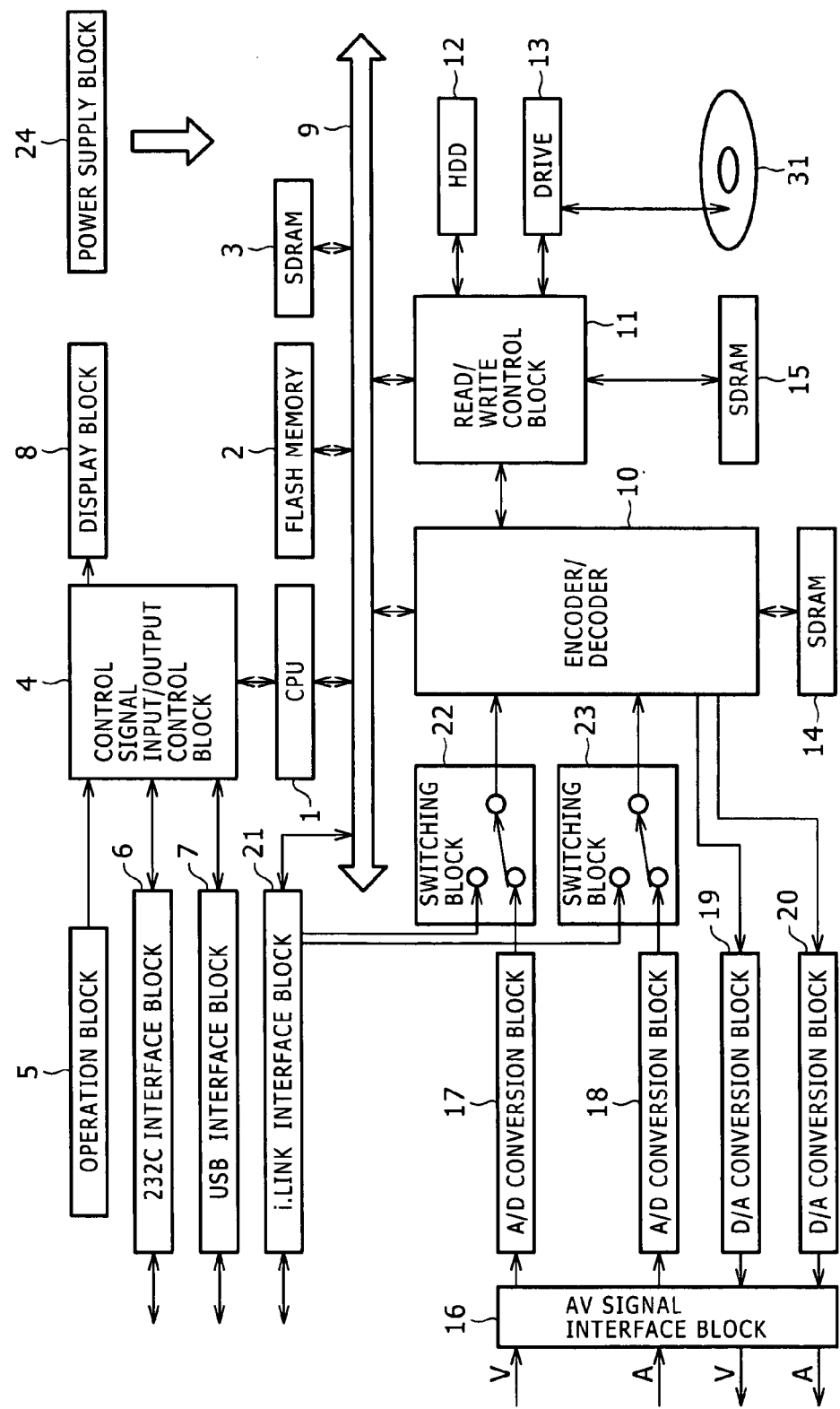
FIG. 1 is a block diagram illustrating an exemplary hardware configuration of a recording/reproducing apparatus practiced as one embodiment of the invention.

This invention will be described in further detail by way of embodiments thereof with reference to the accompanying drawings. This invention will be described in further detail by way of example with reference to the accompanying drawings. The invention described herein and the embodiments thereof have the following correlation. The description hereof is intended to make sure of the fact that the embodiments supporting the invention described in the claims are described in the description of the preferred embodiment. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

According to the present invention, an information processing apparatus is provided. This information processing apparatus (for example, a recording/reproducing apparatus having a hardware configuration shown in FIG. 1 and a functional configuration shown in FIG. 2) records data to a recording medium of a first type (for example, a DVD 31 shown in FIGS. 1 and 2) and a recording medium of a second type (for example, a HDD 12 shown in FIGS. 1 and 2) and has a first recording controller (for example, a HDD recording control block 43 shown in FIG. 2) for controlling recording of recording data (for example, data outputted from an encoder/decoder 10 shown in FIG. 1, namely, compressed content data to be described later) to be recorded to a first recording medium of the first type (for example, a DVD 31-1 shown in FIG. 2) to a recording medium of the second type by relating the recording data with recording medium identification information (for example, error DVD identification information referenced in step S45 of FIG. 6) for identifying the first recording medium and a second recording controller (for example, a DVD recording control block 44 shown in FIG. 2) for controlling recording of the recording data to the first-type recording medium. If a trouble occurs on the first recording medium, the second recording controller identifies and reads the recording data related with the recording medium identification information of the first recording medium from the recording medium of the second-type, thereby recording the recording data to a second recording medium of the first type.

The above-mentioned information processing apparatus further has a loader (for example, a drive 13 shown in FIG. 1) for loading a recording medium of the first type, a detector (for example, a DVD defect detection block 45 shown in FIG. 2) for detecting whether a trouble has occurred on the first recording medium while control for recording the recording data to the first recording medium loaded on the loader is being executed by the second recording controller, and a presentation device (a display control block 46 shown in FIG. 2; the display block 8 shown in FIGS. 1 and 2 may be included) for, if a trouble that has occurred on the first recording medium is detected by the detector, notifying a user thereof.

In this configuration, the fist recording controller continues control of recording the recording data to a recording medium of the second type regardless of a result of the detection by the detector and the second recording controller, if the occurrence of a trouble on the first recording medium is detected by the detector, stops control of recording the recording data to the first recording medium and, if, after control of recording the recording data to a recording medium of the second type by the first recording controller has been completed, the user unloads the first recording medium from the loader upon recognition of contents of the notification given by the presentation device and then loads the second recording medium, identifies and reads the recording data related with the recording medium identification information of the first recording medium from a recording medium of the second type, thereby recording the recording data to the second recording medium.

According to the present invention, an information processing method is provided. This information processing method (for example, a method corresponding to recording processing shown in FIG. 5) is for an information processing apparatus (for example, a recording/reproducing apparatus having a hardware configuration shown in FIG. 1 and a functional configuration shown in FIG. 2) and has steps of controlling recording of recording data to be recorded to a first recording medium of the first type to a recording medium of the second type by relating the recording data with recording medium identification information for identifying the first recording medium (for example, mainly step S24 shown in FIG. 5 and step S45 shown in FIG. 6), controlling recording of the recording data to the first-type recording medium (for example, mainly steps S26 and S28 shown in FIG. 5), and identifiably reading, if a trouble occurs on the first recording medium, the recording data related with the recording medium identification information of the first recording medium from the recording medium of the second-type, thereby recording the recording data to a second recording medium of the first type (for example, steps S50 and S51 shown in FIG. 6).

According to the present invention, a computer program is provided. This computer program corresponds to the above-mentioned information processing method according to the invention and is executed by a computer having a CPU 1 shown in FIG. 1 for example.

The following describes embodiments of the present invention with reference to accompanying drawings.

Now, referring to FIG. 1, there is shown an exemplary hardware configuration of a recording/reproducing apparatus practiced as one embodiment of the invention.

In the exemplary recording/reproducing apparatus shown in FIG. 1, the CPU (Central Processing Unit) 1 executes various processing operations instructed by various programs loaded from a flash memory 2 into an SDRAM (Synchronous Dynamic Random Access Memory) 3. Consequently, operations of the entire recording/reproducing apparatus are controlled. The SDRAM 3 also stores data necessary for the CPU 1 to execute various processing operations, from time to time.

This CPU 1 is also connected with a control signal input/output control block 4. The control signal input/output control block 4, made up of a microcomputer for example, controls the transfer of various control signals between the CPU 1 and blocks such as an operation block 5, a 232C interface block 6, a USB interface block 7, and a display block 8.

The operation block 5 is made up of various input devices such as a keyboard, a power switch and a foot switch. Namely, by operating the operation block 5, the user is able to enter various commands and various kinds of information into this recording/reproducing apparatus. In other words, the operation block 5 is able to supply control signals corresponding to operations done by the user to the CPU 1 and so on via the control signal input/output control block 4.

The 232C interface block 6 is connected with external devices, not shown, via a dedicated RS-232C cable. Namely, the 232C interface block 6 relays various kinds of information (or control signals) to be transferred between the external devices and CPU 1 for example in accordance with the RS-232 standard. The USB (Universal Serial Bus) interface block 7 is connected with external equipment, not shown, via a dedicated USB cable. Namely, the USB interface block 7 relays various kinds of information (or control signals) to be transferred between the external devices and the CPU 1 for example in accordance with the USB standard.

The display block 8, configured as a front panel display monitor for example, displays various kinds of information associated with this recording/reproducing apparatus, namely, various kinds of information corresponding to various kinds of control signals supplied from the CPU 1 for example via the control signal input/output control block 4.

The CPU 1, the flash memory 2, and the SDRAM 3 are interconnected via a bus 9. This bus 9 is also connected with an encoder/decoder 10 and a read/write control block 11.

Under the control of the CPU 1, the encoder/decoder 10 encodes (or compressing encodes) digital video signal V supplied from a switching block 22 to be described later and digital audio signal A supplied from a switching block 23 to be described later by the MPEG (Moving Picture Experts Group) standard for example and supplies the compression-encoded signals to the read/write control block 11. It should be noted that encoded video data and audio data outputted from the encoder/decoder 10 are hereafter generically referred to as compressed content data.

Under the control of the CPU 1, the encoder/decoder 10 also decodes (or decompression decodes) compressed content data supplied from the read control block 11 to be described later by the MPEG standard for example and supplies digital video signal V of the decoded data to a D/A conversion block 19 and digital audio signal A to a D/A conversion block 20.

The encoder/decoder 10 is connected with an SDRAM 14. The SDRAM 14 stores data necessary for the encoder/decoder 10 to execute the above-mentioned processing, from time to time.

Under the control of the CPU 1, the read/write control block 11 controls data read/write operations on a HDD 12 or a DVD (Digital Versatile Disk) 31 loaded on a drive 13.

For example, in the present embodiment, when compressed content data is supplied from the encoder/decoder 10, the read/write control block 11 first executes control to record (or write) the supplied compressed content data to the HDD 12 as recording data. Next, the read/write control block 11 executes control to read the data recorded in the HDD 12 to record (or write) the data to the DVD 31 loaded on the drive 13.

It should be noted that, the ATA (AT Attachment) standard is employed in the present embodiment, so that data to be recorded is first recorded to the HDD 12 and then to the DVD 31. Obviously, however, it is also practicable to use a predetermined standard other than the ATA standard, thereby recording concurrently data to the HDD 12 and the DVD 31 (independently at generally the same time).

The read/write control block 11 executes, for example, control for reading data (compressed content data and various kinds of management information for example) from the HDD 12 or the DVD 31 loaded on the drive 13, thereby supplying the read data to other blocks such as the encoder/decoder 10 as required.

The read/write control block 11 is connected with an SDRAM 15. The SDRAM 15 stores data necessary for the read/write control block 11 to execute the above-mentioned processing for example, from time to time.

An AV signal interface block 16 is connected with external devices, not shown, via various cables. For example, an analog video signal V (to be more specific, video signal V for example corresponding to the above-mentioned image of the inside of patient's body) supplied from a first external device (to be more specific, the above-mentioned ultrasonic diagnostic equipment for example) is supplied to an A/D conversion block 17 via the AV signal interface block 16. Analog audio signal A supplied from the first external device is supplied to an A/D conversion block 18 via the AV signal interface block 16. On the other hand, an analog video signal V supplied from the encoder/decoder 10 via D/A conversion block 19 and an analog audio signal A supplied from the encoder/decoder 10 via the D/A conversion block 20 are supplied to a second external device (to be more specific, a display monitor for example) via the AV signal interface block 16.

An i.LINK interface block 21 is connected to an external device, not shown, via a dedicated i.LINK cable. "i.LINK" is a trademark of Sony Corporation, applicant hereof, and provides a high-speed digital serial interface compliant with the IEEE (Institute of Electrical and Electronics Engineers) 1394 standard. Therefore, the i.LINK interface block 21 relays various kinds of information (video signal, audio signal, control signal, etc.) between the connected external device and the CPU 1 and the connected external device and the encoder/decoder 10 for example in accordance with the IEEE 1394 standard. Namely, when a control signal is supplied from the connected external device, the i.LINK interface block 21 supplies the received control signal to the CPU 1. On the other hand, when video signal V is supplied from the connected external device, the i.LINK interface block 21 converts the received video signal into the signal of a proper form (in the present embodiment, the signal of the same form as digital video signal V outputted from the A/D conversion block 17) before supplying to the switching block 22. When audio signal A is supplied from the connected external device, the i.LINK interface block 21 converts the received audio signal into the signal of a proper form (in the present embodiment, the signal same form as digital audio signal A outputted from the A/D conversion block 18) before supplying to a switching block 23. It should be noted that external devices connected to the i.LINK interface block 21 include the above-mentioned ultrasonic diagnostic equipment for example.

The switching block 22 switches between input terminals thereof to supply the digital video signal V inputted at the switched input terminal to the encoder/decoder 10. Namely, the switching block 22 selects one of the input terminal at which the digital video signal from the i.LINK interface block 21 is entered and the input terminal at which the digital video signal V from the A/D conversion block 17 is entered and supplies the digital video signal V entered at the selected input terminal to the encoder/decoder 10.

The switching block 23 switches between input terminals thereof to supply the digital audio signal A entered at the switched input terminal to the encoder/decoder 10. Namely, the switching block 23 selects one of the input terminal at which the digital audio signal A from the i.LINK interface block 21 is entered and the input terminal at which the digital audio signal A from the A/D conversion block 18 is entered and supplies the digital audio signal A entered at the selected input terminal to the encoder/decoder 10.

A power supply block 24 supplies power to each of the other blocks constituting the recording/reproducing apparatus shown in FIG. 1. It should be noted that the power supply lines connecting the blocks constituting the recording/reproducing apparatus are generically indicated with white arrows for the brevity of description as shown in FIG. 1.

It should be noted that, although not shown, the drive 13 may also be adapted to appropriately load removable recording media such as a magnetic disk, an optical disk, an magneto-optical disk, and a semiconductor memory, in addition to the DVD 31. In this case, each loaded removable recording medium becomes the subject of control by the read/write control block 11. Namely, the above-mentioned recording data for example is written to each loaded removal recording medium. If a computer program is recorded to a loaded removable recording medium, the computer program read therefrom via the drive 13 is installed in a memory such as the HDD 12 for example as required.

In other words, the media on which recording data is read or written, namely, the type of media to be controlled by the read/write control block 11 are HDD 12 and the DVD 31 in FIG. 1; however, these media may be of any other types.

It should also be noted that the hardware configuration itself is not restricted to the example shown in FIG. 1; namely, any other hardware configurations are applicable as far as at least a functional configuration shown in FIG. 2 to be described later is provided.

Figure 2:
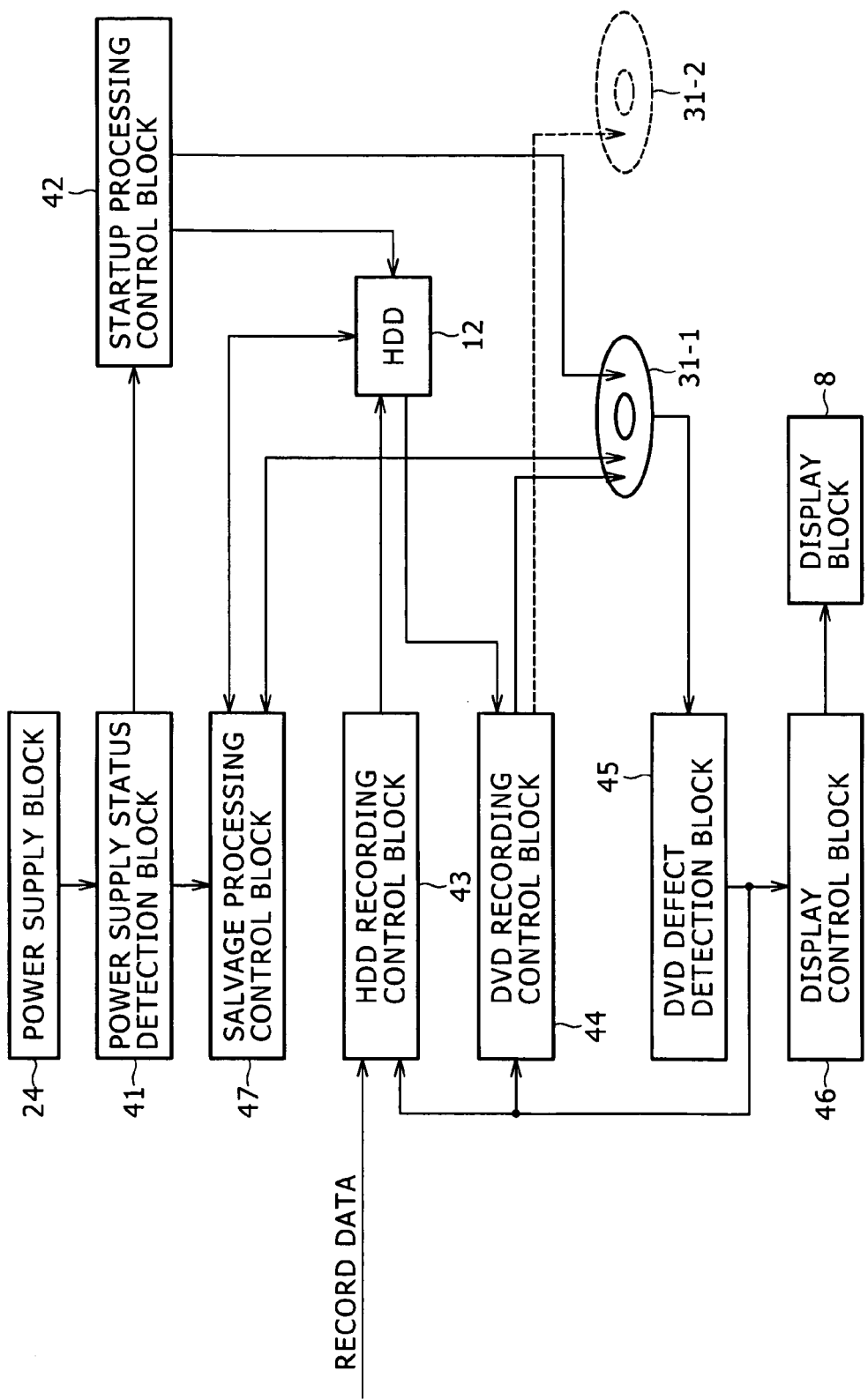
FIG. 2 is a functional block diagram illustrating an exemplary configuration of functions for realizing recording functions among functions of the recording/reproducing apparatus shown in FIG. 1.

The following describes, of the functions of the recording/reproducing apparatus shown in FIG. 1, an exemplary functional configuration for realizing a function for recording data to the HDD 12 and the DVD 31, with reference to FIG. 2. Namely, FIG. 2 shows an exemplary functional configuration of the recording function of the recording/reproducing apparatus.

It should be noted that, in the present embodiment, functional blocks ranging from a power supply status detection block 41 to a display control block 46 are each configured as application software that is executed by the CPU 1 shown in FIG. 1. It is also practicable that each functional block may be configured by a combination of the application software and one or more predetermined hardware blocks shown in FIG. 1 (or it may be understood as such). It is also practicable to configure each of the functional blocks ranging from the power supply status detection block 41 to the display control block 46 as a single hardware unit by providing a different hardware configuration of the recording/reproducing apparatus than that shown in FIG. 1.

It is sufficient for the realization of recording-associated functions only to totally have the functions of the power supply status detection block 41 through display control block 46, so that the total number of functional divisions, namely, the number of functional blocks is not especially restricted to that of the example shown in FIG. 2. Namely, the power supply status detection block 41 through display control block 46 may be further divided into smaller functional blocks or two or more of these blocks may be combined into one.

It should be noted that, in the example shown in FIG. 2, two DVDs, a DVD 31-1 and a DVD 31-2, are shown, which will be hereafter generically referred to as the DVD 31 unless otherwise necessary.

In the recording/reproducing apparatus shown in FIG. 2, the power supply status detection block 41 detects a status of the power supply block 24. Namely, the power supply status detection block 41 detects whether the power supply block 24 is in an on status or an off status. A result of the detection by the power supply status detection block 41 is supplied to a startup processing control block 42 and a salvage processing control block 47.

The startup processing control block 42 controls the startup processing of the drive 13 and the DVD 31 when the power supply block 24 has been turned on, or the status of the power supply block 24 has shifted from the off status to the on status and this shift is notified from the power supply status detection block 41.

The startup processing of the HDD 12 includes power-on processing, reset issue processing, disk rotational delay (confirmation) processing, and processing in which an identify command (for obtaining device information of the HDD 12) is issued to check a connection status thereof.

The startup processing of the DVD 31 includes physical and logical format processing of the DVD 31, OPC (laser recording condition test processing), and inner/outer area information write processing, for example. Inner/outer area information write processing denotes the writing specified information in physical format to the inner or outer area of the DVD 31. Specified information includes disk category, disk size, recording enabled/disabled information, for example.

It should be noted here that the startup processing of the DVD 31 includes such processing taking long as OPC and inner/outer area information write processing, so that, as compared with the startup processing of the HDD 12, the startup processing of DVD 31 takes far longer. Therefore, in the present embodiment, recording data is recorded first to the HDD 12 of which startup processing is completed first, namely, the recording of data to be recorded to the HDD 12 starts first during the startup processing of the DVD 31. Then, when the startup processing of the DVD 31 has been completed, the recording data recorded to the HDD 12 so far is dubbed (or recorded) at high speeds to the DVD 31 and the data recorded to the DVD 31 has caught up with the data recorded to the HDD 12, the recording data is recorded to the HDD 12 and the DVD 31 in that sequence. In what follows, the above-mentioned sequence of processing operations will be generically referred to as follow-up recording processing. This follow-up recording processing will be detailed later with reference to the flowchart shown in FIG. 5.

Compressed content data for example is entered from the encoder/decoder 10 into a HDD recording control block 43 as recording data. Therefore, the HDD recording control block 43 controls the HDD 12 to record the data to be recorded.

At this moment, so as to realize salvage processing (refer to FIG. 3 to be described later) by the salvage processing control block 47 to be described later, the HDD recording control block 43 controls the HDD 12 to record data to be recorded to the HDD 12 in compliance with the file system of the HDD 12 without stream data management information (namely, management information 72 shown in FIG. 3) unique to the format of the DVD 31.

Namely, in the HDD 12, a recording and reproducing operation (or a read/write operation) of recording data is managed by a DVD-format independent file system, or, to be specific, a file system in which a data unit (for example, 512 KB) and a time that are smaller than a management unit (namely, a title to be described later) managed by stream data management information.

A DVD recording control block 44 executes control of reading recorded data of the HDD 12 to record the read data to the DVD 31.

At this moment, the DVD recording control block 44 executes control of writing data to be recorded to the DVD 31 with a title (refer to a title 71 shown in FIG. 3 to be described later) as major unit and a chapter as minor unit.

A title herein denotes an interval of recording from a time when the starting of recording is specified to a time when the ending of recording is specified. In the present embodiment, up to 49 titles are recordable on one DVD 31 in accordance with the DVD format. Each title is related with one piece of stream management information (hereafter simply referred to as management information). Namely, the DVD recording control block 44 executes control of recording by relating one title with management information thereof to the DVD 31.

A chapter herein denotes an interval between two indexes. Namely, in the present embodiment, by operating the operation block 5, the user is able to attach a marker index to a desired position (for example, a position corresponding to a desired image) in the recording data to be continuously recorded (namely, a data stream). Also, by executing a predetermined registration operation, the user is able to make the recording/reproducing apparatus automatically attach indexes (for example, at predetermined time intervals). Then, by operating the operation block 5, the user is able to easily reproduce the recording data instantaneously from each indexed position and repeat reproduction of the recording data between indexes (or chapters). The present embodiment allows the attachment of up to 254 indexes for one DVD 31 in accordance with the DVD format and up to 99 indexes for one title.

To be more precise, the DVD recording control block 44 executes control of relating one title with one piece of management information to record to the DVD 31. This control will be detailed later with reference to FIG. 3.

A DVD defect detection block 45 detects whether there is any trouble (or defect) on the DVD 31 on the basis of the presence (or measure) of a recording error of that DVD 31 during the recording control of the DVD 31 by the DVD recording control block 44. A result of the detection by the DVD defect detection block 45 is supplied to the HDD recording control block 43, the DVD recording control block 44, and the display control block 46.

For example, if a detection result indicative of the occurrence of a trouble on the DVD 31 comes from the DVD defect detection block 45, then the DVD recording control block 44 stops (or disables) the control processing being executed, upon which the display control block 46 causes the display block 8 to show (or present) an alert indicative of the occurrence of a trouble on the DVD 31.

It should be noted here that, if a trouble on the DVD 31 stopped (or disabled) the control processing by the DVD recording control block 44, the control processing by the HDD recording control block 43 still continues, namely, the recording data is kept recorded to the HDD 12 without interruption. In addition, the HDD recording control block 43 executes steps S43 through S45 shown in FIG. 6 to be described later, of which description is skipped here.

Therefore, even if a trouble occurs on the DVD 31-1 shown in FIG. 2, the reading of recorded contents is disabled by a scratch or damage after recording without involving any trouble on the DVD 31-1 during recording or the DVD 31-1 itself is lost, all of the recording data to be recorded to already recorded to the DVD 31-1 (hereafter referred to as recording contents of the DVD 31-1) is also recorded to the HDD 12. Consequently, the user is able to load a new DVD 31-2 on the drive 13 (refer to FIG. 1) to dub the recording contents of the DVD 31-1 from the HDD 12 to the DVD 31-2, or recover, on the DVD 31-2, the recording contents of the DVD 31-1. In this case, the DVD recording control block 44 reads the recording contents of the DVD 31-1 from the HDD 12 and records the recording contents to the DVD 31-2. It should be noted that a sequence of processing operations to be executed by the recording/reproducing apparatus so as to recover the recording contents of a DVD on which a trouble such as mentioned above occurred are referred to as a DVD recovery processing. The DVD recovery processing will be detailed later with reference to the flowchart shown in FIG. 6.

Figure 3:
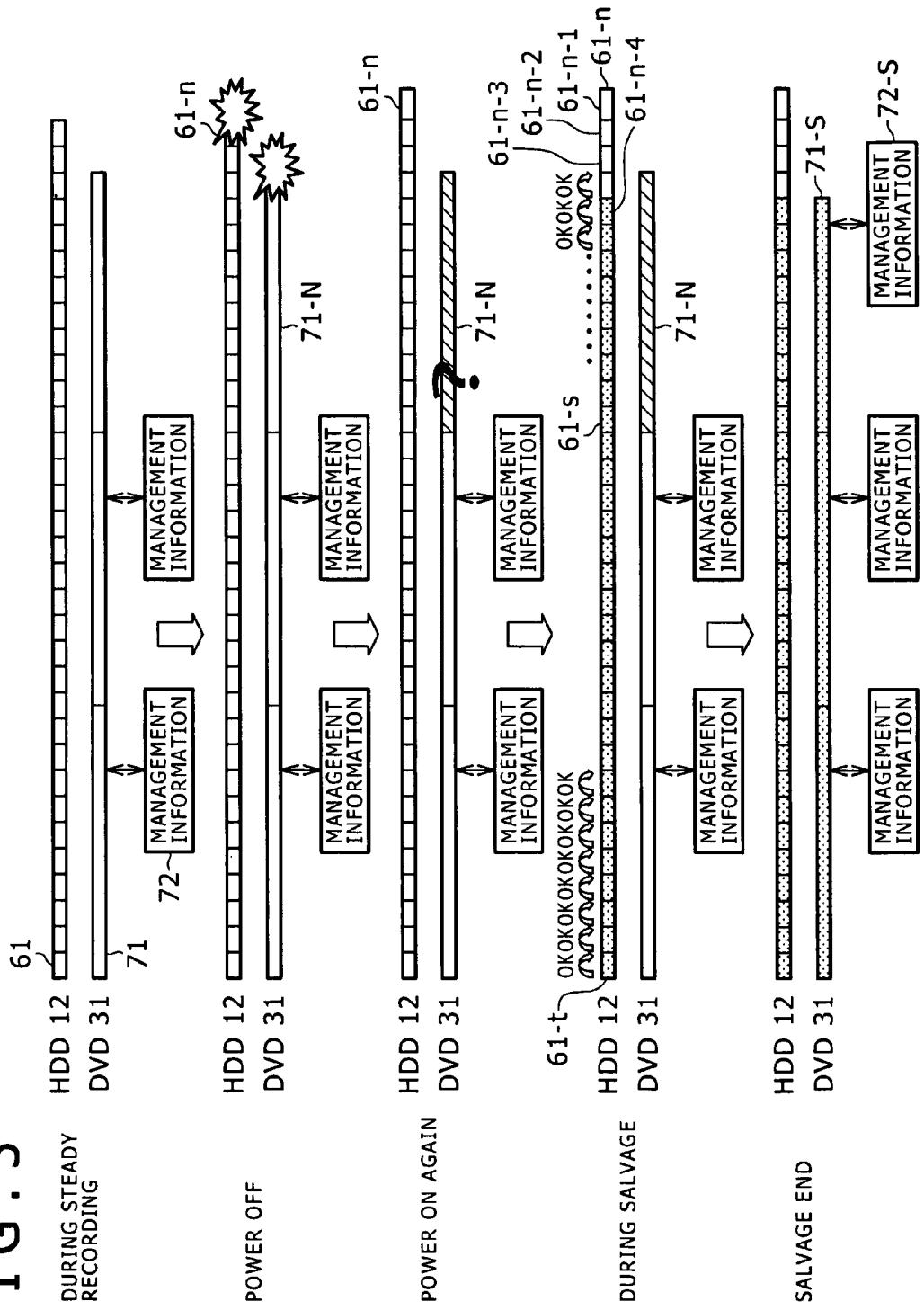
FIG. 3 is a schematic diagram illustrating exemplary salvage processing to be executed by a salvage processing control block shown in FIG. 2.
Figure 4:
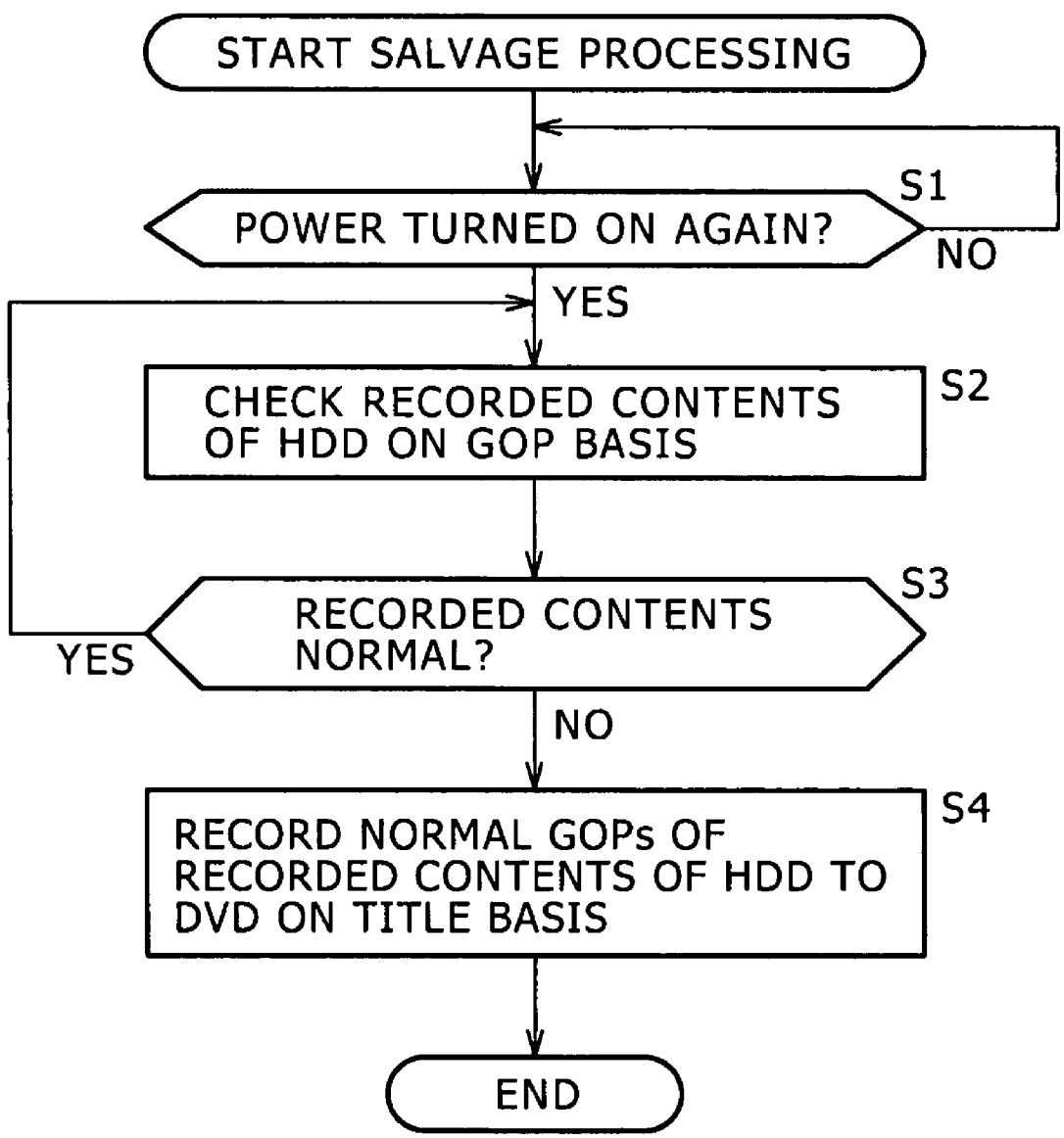
FIG. 4 is a flowchart indicative of the salvage processing to be executed by the salvage processing control block shown in FIG. 2.

The salvage processing control block 47 controls the execution of salvage processing shown in FIGS. 3 and 4, for example.

To be more specific, FIG. 3 shows salvage processing (or a technique for realizing salvage processing) practiced as one embodiment of the invention. FIG. 4 shows a flowchart indicative of this salvage processing. The following describes the above-mentioned salvage processing with reference to these figures.

FIG. 3 shows the recording contents of the HDD 12 and the DVD 31 at timings of "During steady recording", "Power off", "Power on again", "During salvage", and "Salvage end", in this order.

"During steady recording" denotes a predetermined timing in which the recording/reproducing apparatus shown in FIG. 2 is in a normal status (the power supply block 24 is in the power on status).

"During steady recording", the recording of data to be recorded to the HDD 12 is executed on a data unit (512 KB for example) basis specified in the file system of the HDD 12, independently of the DVD format as described above. However, in the present embodiment, recording data is the content data compressed by MPEG, so that this unit (512 KB for example) is insignificant for the unit of the data to be salvaged; at least the GOP (Group Of Picture) unit must be used. Namely, it is at least necessary that the data have no failure in the GOP unit. Therefore, the recording contents of the HDD 12 shown in FIG. 3 are indicated as if a GOP 61 were one unit. On the other hand, the recording of recording data to the DVD 31 is executed in unit of a title 71 as described above, in which one title 71 is related with one piece of management information 72.

"Power off" denotes a status in which the power supply block 24 has shifted from power-on status to power-off status. In the example shown in FIG. 3, a predetermined timing during the recording of the recording data corresponding to GOP 61-n to the HDD 12 and during the recording of the recording data corresponding to title 71-N to the DVD 31 is "power off" timing.

If the management information 72 corresponding to this title 71-N has not written to the DVD 31 by the occurrence of this "power off", this last title 71-N is deleted in its entirety from the drive 13 as described above. This is indicated in the recording contents of the drive 13 to the right of "Power on again". Namely, in the example shown in FIG. 3, title 71-N is hatched, thereby indicating the deletion of title 71-N. It should be noted that "Power on again" denotes a status in which the power supply block 24 has shifted from power-off status to power-on status again.

Consequently, in the present embodiment, the salvage processing control block 47 is able to execute the salvage processing as shown to the right of "During salvage" and "Salvage processing" shown in FIG. 3. To be more specific, "During salvage" denotes a timing during which the salvage processing is being executed by the salvage processing control block 47. "Salvage end" denotes a timing at which the salvage processing by the salvage processing control block 47 has ended.

As shown to the right of "During salvage", the salvage processing control block 47 checks the recording data, from the beginning thereof, equivalent to the recording contents of the DVD 31 of the recording contents of the HDD 12. This check is executed in a data unit (512 KB for example) in the file system of the HDD 12 as described above; however, the minimum unit of salvage processing is GOP (15 frames for example), so that the GOP unit is used as the check unit here. Namely, the salvage processing control block 47 checks whether each of GOPs making up the recording data equivalent to the recording contents of the DVD 31 is normal or not, starting with the first GOP 61-t sequentially.

It should be noted that, in the example shown in FIG. 3, GOP 61-t through GOP 61-n-4 are found normal (OK) and subsequent GOP 61-n-3 through GOP 61-n-4 are found abnormal (NG).

Therefore, in this case, the salvage processing control block 47 reads GOP 61-t through GOP 61-n-4 from the HDD 12, divides the GOPs into titles, relates the titles with the management information one to one, and records these titles and the management information to the DVD 31. Consequently, as shown to the right of "Salvage end", title 71-s equivalent to deleted title 71-N, namely, title 71-s that includes the normal part of the recording data corresponding to title 71-N recorded to the HDD 12 is recorded (or recovered) to the DVD 31 along with the management information 72-s of title 71-s.

As described above, in the HDD 12, recording data is managed by a file system that specifies a data unit and a timing smaller than those of a file system of the drive 13, so that, if such a trouble occurs on the recording/reproducing apparatus shown in FIG. 2 as power failure, more pieces of data (or more pieces of normal data) may survive than on the DVD 31. Therefore, in the present embodiment, if such a trouble occurs on the recording/reproducing apparatus as power failure, the salvage processing control block 47 is able to record the surviving data on the HDD 12 to the drive 13. Consequently, the above-mentioned novel configuration is capable of surely protecting the recording data up to a failure point (namely, the data included in the last title being recorded to the DVD 31).

If such a trouble occurs on the recording/reproducing apparatus shown in FIG. 2 as power failure as shown in FIG. 3, the management information corresponding to the titles other than the last title being recorded to the DVD 31 at the point of the occurrence of the trouble (namely, title 71-N in the example shown in FIG. 3) is recorded to the DVD 31, so that these other titles may be normally read after the power supply block 24 is powered on again (namely, these other titles are not deleted). Therefore, in the above-mentioned example, the detection for a data failure on the HDD 12 started with GOP 61-t corresponding to the beginning of the recording contents of the DVD 31, but it is also practicable to start the detection with GOP 61-s corresponding to the beginning of deleted title 71-N. It should be noted that, in order to realize this latter configuration, the HDD recording control block 43 shown in FIG. 2 may store the start address of the title being recorded to the DVD 31 (namely, the last title of the DVD 31), or the start address of GOP 61-s in the example shown in FIG. 3, to a predetermined area on the HDD 12.

The following describes one example of salvage processing with reference to the flowchart shown in FIG. 4.

This salvage processing starts when "Power off" shown in FIG. 3 occurs.

In step S1, the power supply status detection block 41 determines whether the power supply block 24 has been powered on again, namely, whether the power supply block 24 has shifted from power-off status to power-on status again.

As long as the power supply block 24 is in power-off status, the decision in step S1 is that the power supply block 24 has not yet been powered on again and the procedure is kept in step S1. The decision is repeated.

Then, if the power supply block 24 has shifted from power-off status to power-on status again, the decision in step S1 is that the power supply block 24 has been shifted power-on again, and the procedure goes to step S2.

In step S2, the salvage processing control block 47 checks the recording contents of the HDD 12 on a GOP unit basis.

To be more precise, the unit in which the check is made is the data unit of the file system of the HDD 12 as described above; however, for the above-mentioned reason, the unit is simplified to the GOP unit is used in FIG. 4. The GOP to be checked first may be the start GOP of the first title (GOP 61-t in the example of FIG. 3) or the start GOP (GOP 61-s in the example of FIG. 3) of the last title to be salvaged (deleted from the DVD 31 by power failure).

In step S3, the salvage processing control block 47 determines whether the recorded contents are normal or not.

If the recorded contents are found normal in step S3, then the procedure returns to step S2 to repeat the above-mentioned processing therefrom. Namely, the salvage processing control block 47 sequentially determines whether each of the GOPs making up the recording contents of the HDD 12 is normal or not.

If a failing GOP (GOP 61-n-3 in the example of FIG. 3) is found, then the salvage processing control block 47 determines that the recording contents are not normal in step S3, upon which the procedure goes to step S4.

In step S4, the salvage processing control block 47 records the normal GOPs of the recording contents of the HDD 12 to the DVD 31 on a title unit basis (namely, as titles related with the management information).

Thus, the salvage processing ends.

Figure 5:
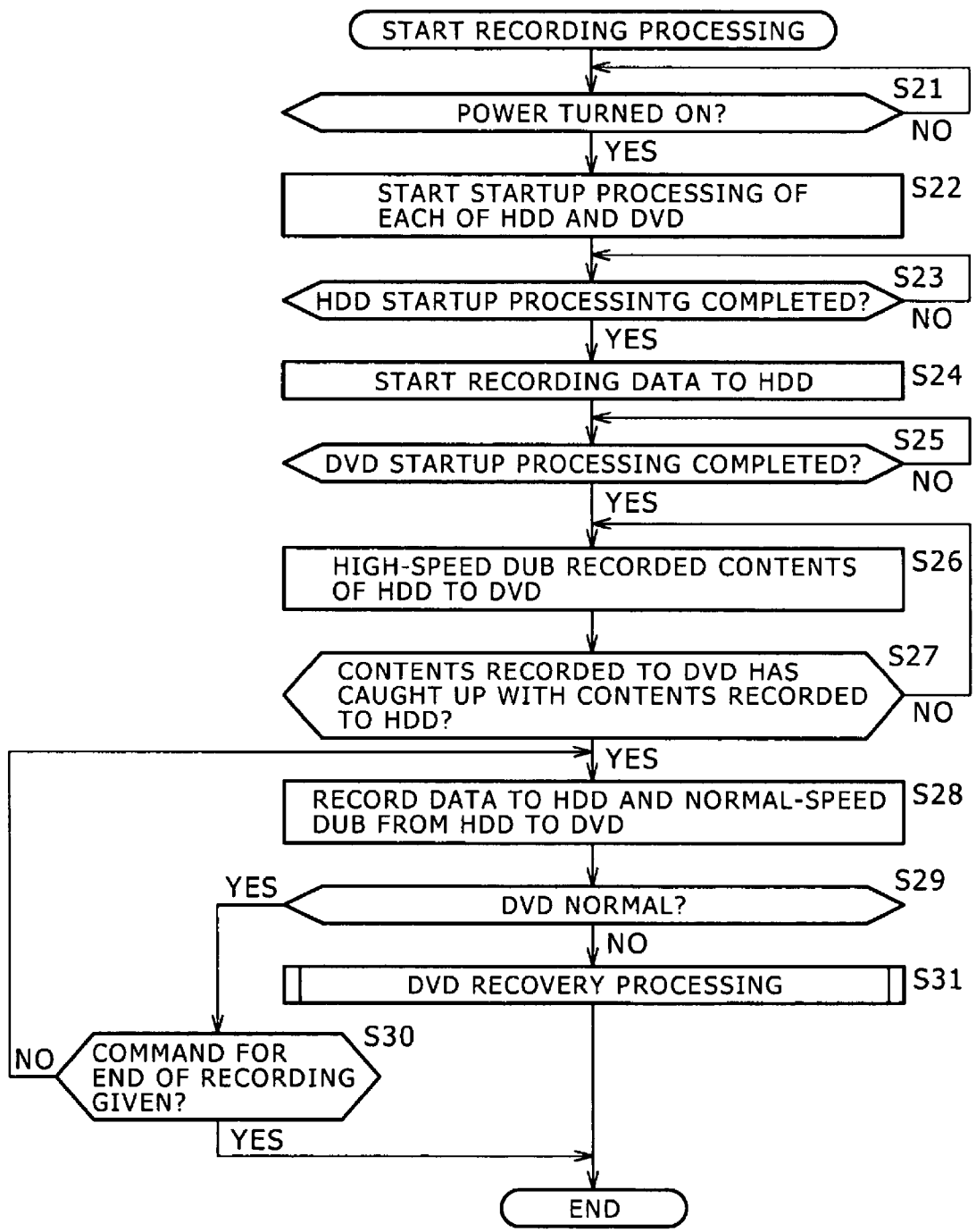
FIG. 5 is a flowchart indicative of exemplary recording to be executed by the recording/reproducing apparatus shown in FIG. 2.

The following describes one example of the recording processing by the recording/reproducing apparatus having the configuration shown in FIG. 2 with reference to the flowchart shown in FIG. 5. To be more specific, FIG. 5 shows a flowchart indicative of an example of recording processing practiced as one embodiment of the invention, the recording processing including the above-mentioned follow-up recording processing and the DVD recovery processing.

In step S21, the power supply status detection block 41 determines whether the power has been turned on, namely, whether the power supply block 24 has shifted from power-off status to power-on status.

As long as the power supply block 24 is in power-off status, the power supply status detection block 41 determines that the power supply block 24 has not been powered on and is kept in step S21 repeating the decision.

Then, when the power supply block 24 has been shifted from power-off status to power-on status, the procedure goes from step S21 to step S22.

In step S22, the startup processing control block 42 begins the startup processing of the HDD 12 and the DVD 31.

As described above, the startup processing of the DVD 31 takes longer than the startup processing of the HDD 12. Namely, the startup processing of the HDD 12 will be completed before the startup processing of the DVD 31. Therefore, in step S23, the HDD recording control block 43 determines whether or not the startup processing of the HDD 12 has been completed.

During the execution of startup processing of the HDD 12, the HDD recording control block 43 determines in step S23 whether the startup processing of the HDD 12 has not been completed and is kept in step S23 to repeat the decision. Namely, during the execution of the startup processing of the HDD 12, the HDD recording control block 43 is put in standby status.

When the startup processing of the HDD 12 has been completed, or when the startup processing of the HDD 12 is found completed in step S23, then the procedure goes from step S23 to step S24.

In step S24, the HDD recording control block 43 starts recording the data to be recorded to the HDD 12. It should be noted that, unless otherwise noted, the HDD recording control block 43 continues the control of recording the recording data to the HDD 12.

During this, the startup processing of the DVD 31 still continues. Therefore, in step S25, the DVD recording control block 44 determines whether the startup processing of the DVD 31 has been completed or not.

During the execution of the startup processing of the DVD 31, the DVD recording control block 44 determines, in step S25, the startup processing of the DVD 31 has not been completed and is kept in step S25 to repeat the decision. Namely, during the execution of startup processing of the DVD 31, the DVD recording control block 44 is put in standby status and recording data is sequentially recorded only to the HDD 12 under the control of the HDD recording control block 43.

When the startup processing of the DVD 31 has been completed, or when the startup processing of the DVD 31 is found completed in step S25, then the procedure goes to step S26.

In step S26, the DVD recording control block 44 high-speed dubs the recorded contents of the HDD 12 (the portion sequentially recorded to the HDD 12 after starting the processing of step S24, of the recording data constituted as a stream). High-speed dubbing herein denotes that the recorded contents of the HDD 12 are read to be recorded to the DVD 31 at a speed higher than that of the recording of the data to the HDD 12 under the control of the HDD recording control block 43. It should be noted that during the high-speed dubbing, new data to be recorded (or a new stream) is sequentially recorded to the HDD 12 under the control of the HDD recording control block 43.

In step S27, the DVD recording control block 44 determines whether the recording contents of the DVD 31 have followed up the recording contents of the HDD 12.

If the recording contents of the DVD 31 are found in step S27 not following up the recording contents of the HDD 12, then the procedure returns to step S26 to repeat the above-mentioned processing therefrom. Namely, after the processing of step S24, new recording contents (or a new portion of stream) are sequentially recorded to the HDD 12 under the control of the HDD recording control block 43, so that, until the recording contents of the DVD 31 have followed up the recorded contents of the HDD 12, the recorded contents of the HDD 12 are high-speed dubbed to the DVD 31.

When the recording contents of the DVD 31 have followed up the recorded contents of the HDD 12, namely, if the recording contents of the DVD 31 are found following up the recorded contents of the HDD 12 in step S27, then the procedure goes to step S28.

In step S28, the HDD recording control block 43 records the data to be recorded (or a new part of stream) to the HDD 12 and the DVD recording control block 44 normal-speed dubs these recording data (a new part of stream) from the HDD 12 to the DVD 31. The normal-speed dubbing herein denotes that data is recorded to the HDD 12 under the control of the HDD recording control block 43 at generally the same speed the recording contents of the HDD 12 are read to be recorded to the DVD 31.

In step S29, the DVD defect detection block 45 determines whether the DVD 31 is normal (or no trouble has occurred on the DVD 31).

If the DVD 31 is found normal (or no trouble is found occurring) in step S29, then the procedure goes to step S30.

In step S30, the HDD recording control block 43 determines whether the end of recording has been specified.

If the end of recording is found not specified in step S30, the procedure returns to step S28 to repeat the above-mentioned processing therefrom. Namely, as long as the DVD 31 is found normal (or no trouble is found on the DVD 31), a loop of step S28, step S29 (Yes), and step S30 (No) is repeated, thereby sequentially recording new data (a new portion of stream) to the HDD 12 and the DVD 31 in this order.

If the end of recording is found specified in step S30, then this recording processing ends.

However, if a trouble occurs on the DVD 31 during the loop of S28, step S29 (Yes), and step S30 (No), the DVD 31 is found not normal in next step S29 and the above-mentioned recovery processing is executed in step S31.

Figure 6:
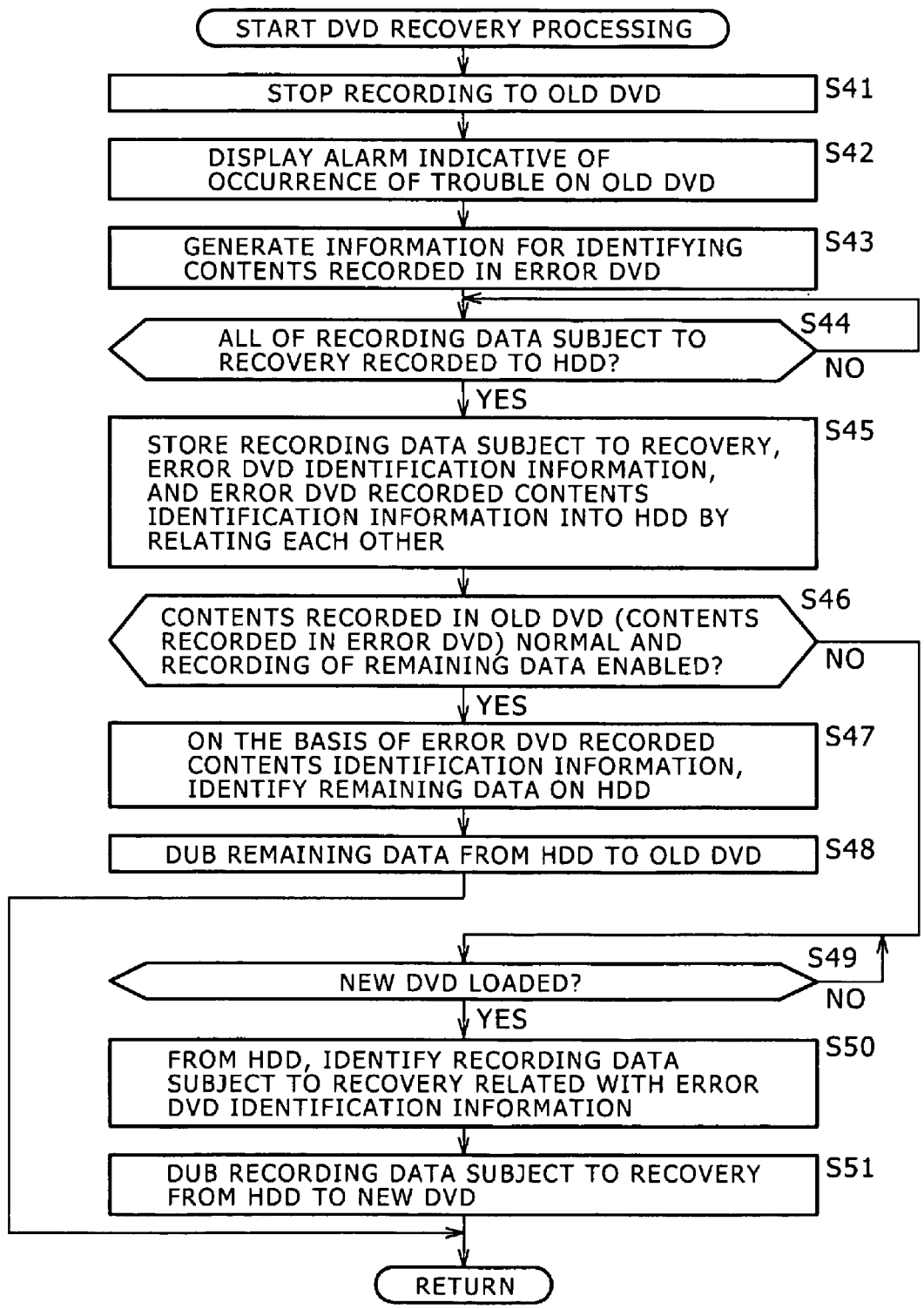
FIG. 6 is a flowchart indicative of exemplary detail DVD recovery processing in step S31 shown in FIG. 5.

A detail example of the above-mentioned DVD recovery processing is indicated by the flowchart shown in FIG. 6. The following describes this detail example of the DVD recovery processing with reference to the flowchart shown in FIG. 6.

It should be noted that, if the DVD 31-1 shown in FIG. 2 is a DVD found not normal (or a trouble has occurred thereon) in step S29 shown in FIG. 5, such a DVD is hereafter referred to as an old DVD 31-1. Then, it is assumed that the recorded contents of the old DVD 31-1 be recovered to the DVD 31-2 shown in FIG. 2. In what follows, such a DVD 31-2 will be referred to as a new DVD 31-2.

In step S41, the HDD recording control block 43 stops recording to the old DVD 31-1.

In step S42, the display control block 46 displays an alert on the display block 8 indicative of the occurrence of a trouble on the old DVD 31-1.

In step S43, the HDD recording control block 43 generates error DVD recording contents identification information.

The above-mentioned error DVD recording contents identification information denotes information (an address for example) indicative of which area on the HDD 12 a portion dubbed to the old DVD 31-1 (hereafter such a portion will be referred to as error DVD recorded contents) is recorded in during a period of time from the starting of the processing of step S26 shown in FIG. 5 to the decision that the processing of step S29 is not normal (namely, a trouble occurred), of the entire recording data (or the entire stream) that should have been recorded to the old DVD 31-1. Namely, this error DVD recording contents identification information allows the identification of the error DVD recording contents from among all recording contents of the HDD 12.

It should be noted that, during this time, new recording data (a new portion of stream) is sequentially recorded to the HDD 12 under the control of the HDD recording control block 43. The new data (or the new portion of stream) is a remaining portion subsequent to the above-mentioned error DVD recorded contents (or a remaining portion of stream) of the entire recording data (or the entire stream) that should have been recorded (or dubbed) to the old DVD 31-1. In what follows, such a remaining portion is referred to as remaining data. Namely, the data composed of the remaining data and the error DVD recorded contents is the entire recording data (or the entire stream) that should have been recorded to the old DVD 31-1, which is subject to recovery. Therefore, the remaining data and the error DVD recording contents will be hereafter together referred to as recording data subject to recovery.

In step S44, the HDD recording control block 43 determines whether all the recording data subject to recovery has been recorded to the HDD 12.

Until all the recording data subject to recovery has been recorded to the HDD 12, the decision in step S44 is No and the procedure is kept in step S44.

When all the recording data subject to recovery has been recorded to the HDD 12, namely, if the decision in step S44 becomes Yes, then the procedure goes to step S45.

In step S45, the HDD recording control block 43 relates the recording data subject to recovery, the error DVD identification information, and the error DVD recorded contents identification information one another and stores these data and information into the HDD 12.

Error DVD identification information herein denotes information that may identify the old DVD 31-1, namely, the DVD 31-1 found not normal (or a trouble has occurred thereon) in step S29 shown in FIG. 5. In other words, error DVD identification information may only be any information that may identify the old DVD 31-1; this information may be an ID originally recorded to the old DVD 31-1 or the information generated by the HDD recording control block 43 during the startup processing of step S22 or at the beginning of the processing of step S26 shown in FIG. 5 and written to the old DVD 31-1. However, in the present embodiment, the latter information provides as the error DVD identification information.

In step S46, the DVD defect detection block 45 determines whether the recorded contents (or error DVD recording contents) of the old DVD 31-1 are normal and the recording of remaining data is executable.

For example, a situation may occur in which, although the old DVD 3-1 is originally normal, the old DVD 31-1 is found not normal (a trouble has occurred thereon) in step S29 shown in FIG. 5 due to erroneous detection for example by the DVD defect detection block 45. In such a situation, the recorded contents (or error DVD recorded content) of the old DVD 31-1 are found normal in step S46 and the recording of the remaining data is executable, upon which the procedure goes to step S47.

In step S47, the DVD recording control block 44 identifies the remaining data (or the recording area thereof) on the HDD 12 on the basis of the error DVD recorded content identification information.

In step S48, the DVD recording control block 44 dubs the remaining data from the HDD 12 to the old DVD 31-1, upon which the DVD recovery processing ends.

In contrast, if the old DVD 31-1 is found not normal (or a trouble has occurred thereon) in step S29 shown in FIG. 5, it often indicates, in general, that at least a portion of the recorded contents (or error DVD recorded contents) of the old DVD 31-1 is failing and/or the further recording of the remaining data is difficult due to a scratch or a damage on the DVD for example. If such a situation occurs, the decision in step S46 is No, upon which the procedure goes to step S49.

In step S49, the DVD recording control block 44 determines whether the new DVD 31-2 has been loaded on the drive 13 (refer to FIG. 1).

During a period of time from the unloading of the old DVD 31-1 from the drive 13 to the loading of the new DVD 31-2 on the drive 13, the decision in step S49 is No and the procedure is kept in step S49.

When the new DVD 31-2 is loaded on the drive 13, namely, if the decision in step S49 is Yes, then the procedure goes to step S50.

In step S50, the DVD recording control block 44 identifies the recording data subject to recovery (or the recording area thereof) related with error DVD identification information on the HDD 12.

In step S51, the DVD recording control block 44 dubs the recording data subject to recovery from the HDD 12 to the new DVD 31-2, upon which the DVD recovery processing ends.

Thus, the flowchart shown in FIG. 6 is indicative of one example of DVD recovery processing to be executed when a trouble has occurred on the DVD 31-1 during the recording of recording data to the DVD 31-1 (during the recording processing shown in FIG. 5).

However, a trouble may occur on the DVD 31-1 even after the normal end of the recording processing shown in FIG. 5 (Yes in step S30), namely, even after the entire recording data (or the entire stream) has been normally recorded to the DVD 31-1. The trouble in this case includes the inability of reading recorded contents due to scratch or damage on the DVD 31-1 after recording and the loss of the DVD 31-1 itself as described above.

In order to execute recovery processing for troubles encountered after normal recording, the information that may identify the DVD 31-1 on which the dubbing from the HDD 12 has normally been completed (or the information equivalent to error DVD identification information, hereafter referred to as DVD identification information) may be related with the information indicative in which area on the HDD 12 the recording contents of the DVD 31-1 (the entire recording data dubbed from the HDD 12, which is the subject to recovery) are stored (the information equivalent to error DVD recorded contents identification information) and these pieces of information may be stored in the HDD 12 before ending of the recording processing.

In this case, although not shown, the recording/reproducing apparatus shown in FIG. 2 may execute the following DVD recovery processing. Namely, the display control block 46 displays a list of DVD identification information for example on the display block 8 to let the user select the old DVD 31-1 subject to recovery. Next, when the user loads the new DVD 31-2 on the drive 13, the DVD recording control block 44 identifies the recording data subject to recovery from the HDD 12 on the basis of the DVD recorded contents identification information related with the DVD identification information of the old DVD 31-1. Then, the DVD recording control block 44 dubs the recording data subject to recovery from the HDD 12 to the new DVD 31-2. Consequently, the DVD recovery processing in this case ends.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

these recording media are constituted by not only a package media made up of the magnetic disk (including flexible disks), the optical disk (including CD-ROM (Compact Disk Read Only Memory) including the DVD 31 shown in FIG. 1), the magneto-optical disk (including MD (Mini Disk) (trademark)), or the semiconductor memory which is distributed separately from the apparatus itself, but also the flash memory 2 shown in FIG. 1 or a hard disk included in the HDD 12 shown in FIG. 1 which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for recording data to a recording medium of a first type and a recording medium of a second type, comprising:

first recording control means for generating recording medium identification information that identifies a first recording medium of the first type, for relating the recording medium identification information and recording data to be recorded to the first recording medium of the first type, and for recording the recording data and the recording medium identification information to a recording medium of said second type; and second recording control means for controlling recording of said recording data to said first-type recording medium, wherein, if a trouble occurs on said first recording medium, said second recording control means identifies said recording data related with said recording medium identification information of said first recording medium, reads said recording data from said recording medium of said second-type, and records said recording data to a second recording medium of said first type, and wherein, while the recording data is recorded to the second recording medium of the first type, new recording data is recorded to the recording medium of the second type, and wherein the new recording data is a remaining subsequent portion to the recording data read from the recording medium of the second type and recorded to the second recording medium of the first type.

2. The information processing apparatus according to claim 1, further comprising:

loading means for loading a recording medium of said first type;

detection means for detecting whether a trouble has occurred on said first recording medium while control for recording said recording data to said first recording medium loaded on said loading means is being executed by said second recording control means; and presentation means for, if a trouble that has occurred on said first recording medium is detected by said detection means, notifying a user thereof, wherein said first recording control means continues control of recording said recording data to a recording medium of said second type regardless of a result of the detection by said detection means and said second recording control means, if the occurrence of a trouble on said first recording medium is detected by said detection means, stops control of recording said recording data to said first recording medium and, if, after control of recording said recording data to a recording medium of said second type by said first recording control means has been completed, said user unloads said first recording medium from said loading means upon recognition of contents of the notification given by said presentation means and then loads said second recording medium, identifies and reads said recording data related with said recording medium identification information of said first recording medium from a recording medium of said second type, thereby recording said recording data to said second recording medium.

3. An information processing method for an information processing apparatus for recording data to a recording medium of a first type and a recording medium of a second type, comprising the steps of:

generating recording medium identification information that identifies a first recording medium of the first type;

relating the recording medium identification information and recording data to be recorded to the first recording medium of the first type;

recording the recording data and the recording medium identification information to a recording medium of said second type;

controlling recording of said recording data to said first-type recording medium;

identifying, if a trouble occurs on said first recording medium, said recording data related with said recording medium identification information of said first recording medium;

reading said recording data from said recording medium of said second-type; and recording said recording data to a second recording medium of said first type, and wherein, while the recording data is recorded to the second recording medium of the first type, new recording data is recorded to the recording medium of the second type, and wherein the new recording data is a remaining subsequent portion to the recording data read from the recording medium of the second type and recorded to the second recording medium of the first type.

4. A computer-readable medium storing a computer program that when executed on a computer controls recording data to a recording medium of a first type and a recording medium of a second type, the program comprising the steps of:

generating recording medium identification information that identifies a first recording medium of the first type;

relating the recording medium identification information and recording data to be recorded to the first recording medium of the first type;

recording the recording data and the recording medium identification information to a recording medium of said second type;

controlling recording of said recording data to said first-type recording medium;

identifying, if a trouble occurs on said first recording medium, said recording data related with said recording medium identification information of said first recording medium;

reading said recording data from said recording medium of said second-type; and recording said recording data to a second recording medium of said first type, and wherein, while the recording data is recorded to the second recording medium of the first type, new recording data is recorded to the recording medium of the second type, and wherein the new recording data is a remaining subsequent portion to the recording data read from the recording medium of the second type and recorded to the second recording medium of the first type.

5. An information processing apparatus for recording data to a recording medium of a first type and a recording medium of a second type, comprising:

a first recording control section for generating recording medium identification information that identifies a first recording medium of the first type, for relating the recording medium identification information and recording data to be recorded to the first recording medium of the first type, and for recording the recording data and the recording medium identification information to a recording medium of said second type; and a second recording control section for controlling recording of said recording data to said first-type recording medium, wherein, if a trouble occurs on said first recording medium, said second recording control section identifies said recording data related with said recording medium identification information of said first recording medium, reads said recording data from said recording medium of said second-type, and records said recording data to a second recording medium of said first type, and wherein, while the recording data is recorded to the second recording medium of the first type, new recording data is recorded to the recording medium of the second type, and wherein the new recording data is a remaining subsequent portion to the recording data read from the recording medium of the second type and recorded to the second recording medium of the first type.

* * * * *